(12) United States Patent
Enya (10) Patent No.: US 7,275,635 B2
(45) Date of Patent: Oct. 2, 2007

(54) FREE FLOW CONVEYANCE SYSTEM

(75) Inventor: Yoshihiro Enya, Nagoya (JP)

(73) Assignee: Startechno Co., Ltd., Nagoya-shi (JP)

( * ) Notice: Subject to any disclaimer, the term of this patent is extended or adjusted under 35 U.S.C. 154(b) by 276 days.

(21) Appl. No.: 10/896,828

(22) Filed: Jul. 20, 2004

(65) Prior Publication Data

US 2005/0269184 A1    Dec. 8, 2005

(30) Foreign Application Priority Data

Jun. 8, 2004   (JP)   ............................. 2004-169308

(51) Int. Cl.
*B65G 37/00*   (2006.01)
(52) U.S. Cl. ................ 198/572; 198/463.2; 198/463.3; 198/464.3
(58) Field of Classification Search ........ 198/570–572, 198/463.1–463.3, 464.1–464.4
See application file for complete search history.

(56) References Cited

U.S. PATENT DOCUMENTS

| | | | | |
|---|---|---|---|---|
| 4,047,625 | A * | 9/1977 | Grant | 414/651 |
| 5,039,270 | A * | 8/1991 | Parks et al. | 414/286 |
| 5,421,446 | A * | 6/1995 | Koch et al. | 198/369.7 |
| 6,105,751 | A * | 8/2000 | Jentjens et al. | 198/435 |
| 6,161,678 | A * | 12/2000 | Cassoli et al. | 198/626.6 |
| 6,176,367 | B1 * | 1/2001 | Patrito | 198/817 |
| 6,216,847 | B1 * | 4/2001 | Schmidt | 198/463.3 |
| 6,494,306 | B1 * | 12/2002 | Hollander | 198/349.5 |
| 6,557,724 | B1 * | 5/2003 | LeCroy et al. | 221/76 |
| 6,574,943 | B2 * | 6/2003 | Van Dam | 53/447 |
| 6,591,965 | B2 * | 7/2003 | Smith et al. | 198/409 |
| 6,612,095 | B2 * | 9/2003 | Hartness | 53/247 |
| 6,625,953 | B1 * | 9/2003 | Smith et al. | 53/250 |
| 6,769,536 | B2 * | 8/2004 | Lutz | 198/861.1 |
| 6,976,573 | B2 * | 12/2005 | Brixius et al. | 198/463.3 |
| 7,032,738 | B2 * | 4/2006 | Tonnigs et al. | 198/463.3 |
| 7,033,130 | B2 * | 4/2006 | Watson et al. | 414/801 |

FOREIGN PATENT DOCUMENTS

JP          2003-118832 A     4/2003

* cited by examiner

*Primary Examiner*—Gene O. Crawford
*Assistant Examiner*—Rashmi Sharma
(74) *Attorney, Agent, or Firm*—Frishauf, Holtz, Goodman & Chick, P.C.

(57) ABSTRACT

A free flow conveyance system includes a plurality of linear conveyance apparatuses each having a plurality of unit conveyors linearly arranged, and a pivot conveyance apparatus having a unit conveyor which is arranged between the linear conveyance apparatuses being so arranged as to form a predetermined angle, wherein product sensors are arranged at the conveying-in side as well as at the conveying-out side of the respective unit conveyors of the linear conveyance apparatuses and the pivot conveyance apparatus, when a product is conveyed to a unit conveyor of the upstream side along the conveyance direction and product sensors of the unit conveyor become of the sensing-product state, in case respective product sensors of a unit conveyor of the downstream side along the conveyance direction are of the not-sensing-product state, these unit conveyors are driven respectively to convey the product, and when the product is consequently conveyed to the unit conveyor of the downstream side along the conveyance direction and conveying-out side product sensors thereof become of the sensing-product state, the respective adjacent unit conveyors are stopped, enabling free flow conveyance.

1 Claim, 12 Drawing Sheets

FREE FLOW CONVEYANCE SYSTEM

BACKGROUND OF THE INVENTION

1. Field of the Invention

The present invention relates to a conveyance system that conveys products or pallets and containers having stored therein products (referred to as products, hereinafter) in the free flow manner.

2. Description of Related Art

In the conventional conveyance system that conveys products, a number of conveyance apparatuses such as roller conveyors, belt conveyors, caterpillar conveyors, etc. whose conveyance path is longer than the length of products along the conveyance direction are coupled, and a lot of products are put on the conveyance apparatuses to be conveyed to desired locations.

The conventional conveyance system, in which a number of conveyance apparatuses whose conveyance path is long are coupled to form a conveyance route, is suitable for conveying a large number of products, while raising the following problems when conveying a small number of various products.

That is, when constructing a conveyance system, a number of conveyance apparatuses having a long conveyance path are coupled to meet a required conveyance distance, which inevitably makes the length of thus formed conveyance route longer than a desired distance. Thus, there arise many dead spaces, leading to low space efficiency.

Especially, when changing the conveyance route or conveyance height, since the conveyance path of one conveyance apparatus is long, curved conveyors with desired curvature or sloped conveyors filling the route change requirement need to be intermediately arranged. In this case, it is also required that large curved conveyors or sloped conveyors having a somewhat long conveyance path be used. So, a large arrangement space is required similarly.

Furthermore, when changing a conveyance line, large and heavy conveyance apparatuses having a long conveyance path have to be relocated, which is troublesome and requires much time undesirably.

Moreover, respective conveyance apparatuses have to be equipped with a large-sized electric motor with high torque so as to meet the maximum number of products to be conveyed. Thus, even if the number of products is small, the electric motor has to be driven under the power corresponding to the maxim number of products to be conveyed, which undesirably increases electric power consumption, leading to high driving cost.

SUMMARY OF THE INVENTION

It is therefore an object of the present invention to overcome the above-mentioned drawbacks by providing a free flow conveyance system that can convey a small number of various products efficiently, and can simplify the line change work to reduce troublesome works at the time of changing a conveyance line corresponding to products. Furthermore, another object of the present invention is to provide a free flow conveyance system that uses a small-sized electric motor with low-torque as a conveyance driving unit, and can reduce driving cost.

DETAILED DESCRIPTION OF THE PREFERRED EMBODIMENTS

The present invention will be described below with reference to the accompanying drawings.

As shown in FIG. 1 to FIG. 5, a free flow conveyance system 1 according to the present invention includes a plurality of linear conveyance apparatuses 3 (specifically, the free flow conveyance system 1 has five linear conveyance apparatuses 3 that are referred to as the first to fifth linear conveyance apparatus 3 respectively), a divergent conveyance apparatus 5 that is arranged, for example, between the first linear conveyance apparatus 3 and the parallel arranged second and third linear conveyance apparatuses 3 to selectively direct the conveyance route from the first linear conveyance apparatus 3 either to the second linear conveyance apparatus 3 or to the third linear conveyance apparatus 3, a pivot conveyance apparatus 7 that is arranged, for example, between the third and fourth linear conveyance apparatuses 3 which are so arranged as to form a predetermined angle, and an elevation conveyance apparatus 9 that is arranged, for example, between the fourth and fifth linear conveyance apparatuses 3 which are so arranged as to form a predetermined difference of elevation.

Figure 1:
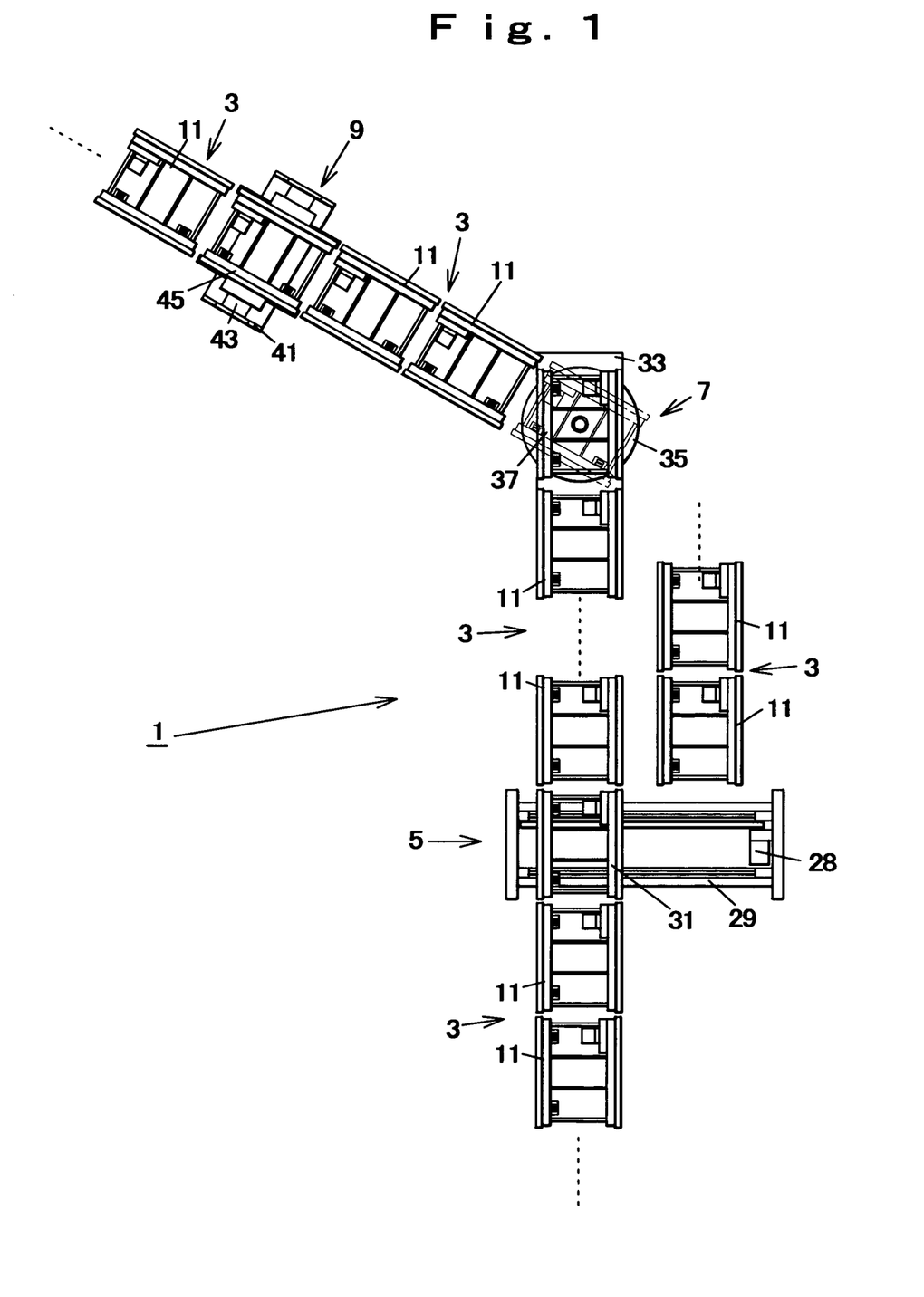
FIG. 1 shows a schematic perspective view of the conveyance system according to the present invention.
Figure 2:
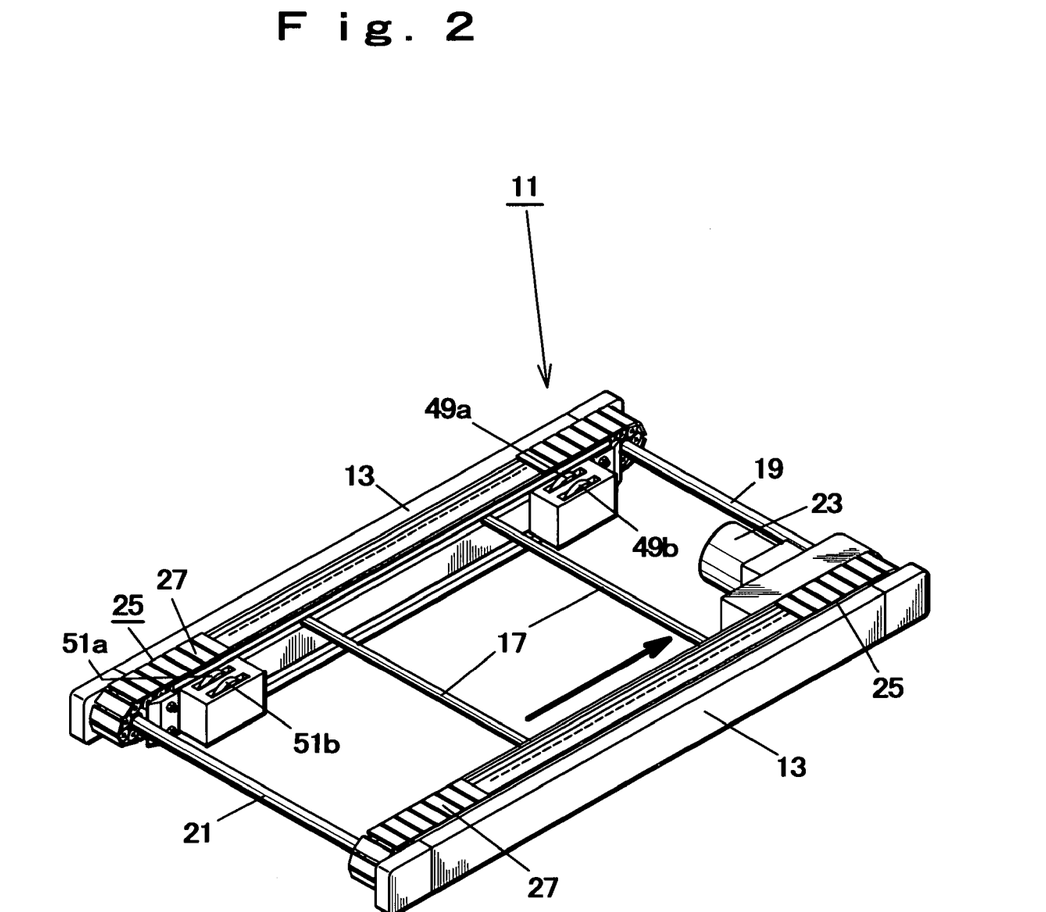
FIG. 2 shows a schematic perspective view of a unit conveyor.

Each of the first to fifth linear conveyance apparatuses 3 has a plurality of unit conveyors 11, corresponding to respective conveyance distances, linearly arranged. A unit conveyors 11 shown in FIG. 2 is of the caterpillar type or the belt type (FIG. 2 shows the caterpillar type), and has a couple of main frames 13 whose length is substantially equal to the length of products 15 along the conveyance direction. The unit conveyors 11 are so fixed by fixing bars 17 as to face each other with a predetermined width of the products 15 along the direction perpendicular to the conveyance direction kept therebetween. That is, the size of each unit conveyors 11 is substantially equal to that of one of the products 15.

Each of the unit conveyors 11 has a drive shaft 19 and a driven shaft 21 rotatably supported at ends (downstream side along the conveyance direction) and the other ends (upstream side along the conveyance direction) of the main frames 13, respectively. The drive shaft 19 has drive gears, not shown, fixed at both ends thereof, while the driven shaft 21 has driven gears, not shown, fixed at both ends thereof. The drive shaft 19 is linked to an electric motor 23, fixed at one of the main frames 13, through train of gears, not shown, and is driven to be rotated by the electric motor 23 along the forward/backward direction.

The unit conveyors 11 have caterpillars 25 hung on the drive gears and the driven gears. Each of the caterpillars 25 is composed of a plurality of unit members 27, which may be made of synthetic resin, specifically, polyamide resin etc., flexibly coupled by pins to form a loop, and is so supported as to slide along the main frame 13 linking the drive gear and the driven gear. Each of the unit members 27 has an anti-slip member, not shown, made of rubber etc. with high coefficient of friction attached to the conveyance surface thereof.

Figure 3:
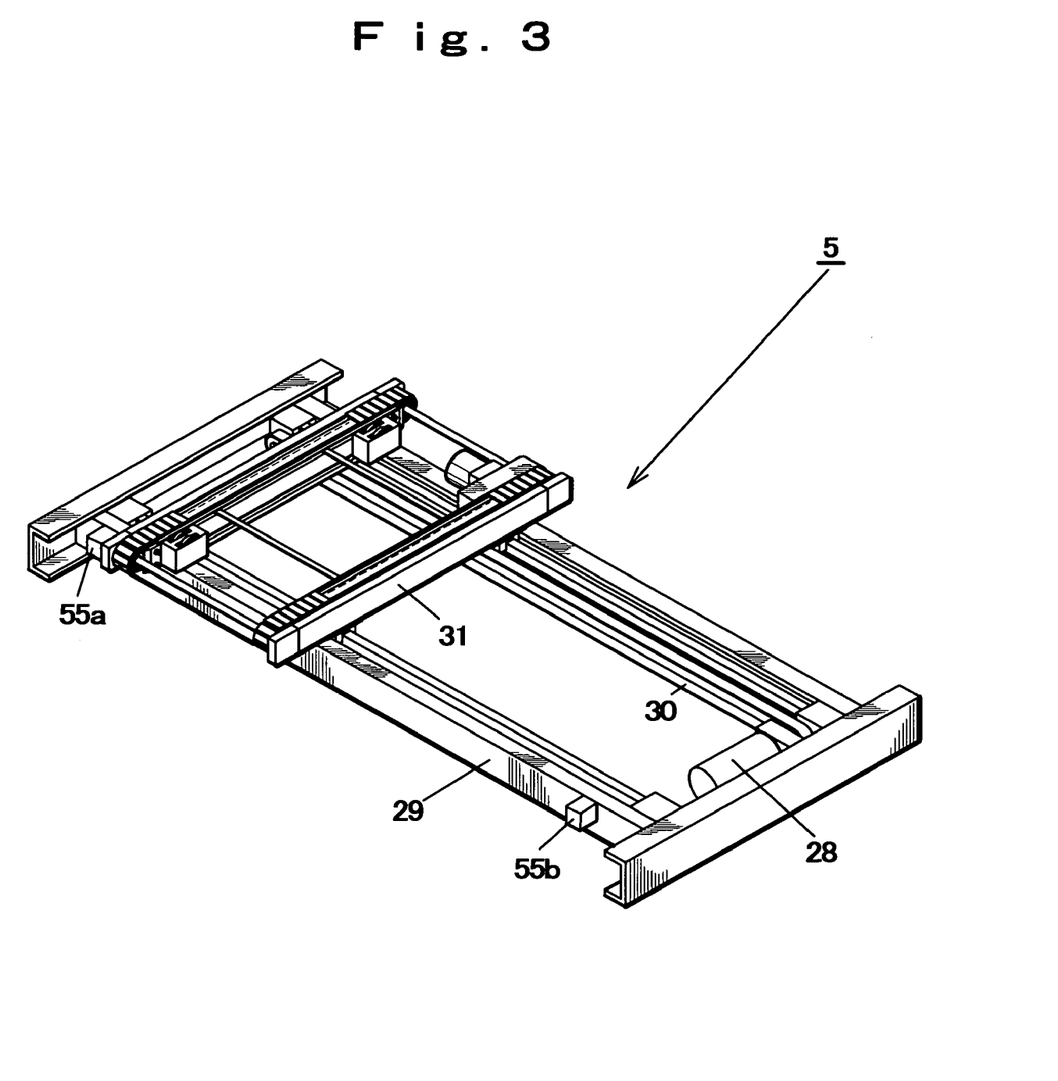
FIG. 3 shows a schematic perspective view of a divergent conveyance apparatus.

The divergent conveyance apparatus 5 is arranged between the conveying-out side or sending-out side of the first linear conveyance apparatus 3 and the conveying-in side or receiving side of the parallel arranged second and third linear conveyance apparatuses 3. The divergent conveyance apparatus 5 has frames 29 whose length is substantially equal to the distance between the outer sides of the second and third linear conveyance apparatuses 3, and a divergent conveyor 31 which is so supported as to reciprocate along the direction perpendicular to the conveyance direction. The divergent conveyor 31 is made to linearly reciprocate between the second and third linear conveyance apparatuses 3 by a reciprocation apparatus, not shown, which holds part of a belt 30 hung on pulleys, not shown, which are, for example, rotatably supported at both ends of the frames 29 and at least one of which is linked to an electric motor 28, so as to selectively direct the conveyance route from the first linear conveyance apparatus 3 either to the second linear conveyance apparatus 3 or to the third linear conveyance apparatus 3. The conveyance direction of the divergent conveyor 31 is equal to that of the first to third linear conveyance apparatuses 3. The configuration of the divergent conveyor 31 is equal to that of the above-described unit conveyor 11, and parts or components similar to those of the unit conveyor 11 are indicated with the same reference numerals if required, and detailed explanation of which will be omitted.

Figure 4:
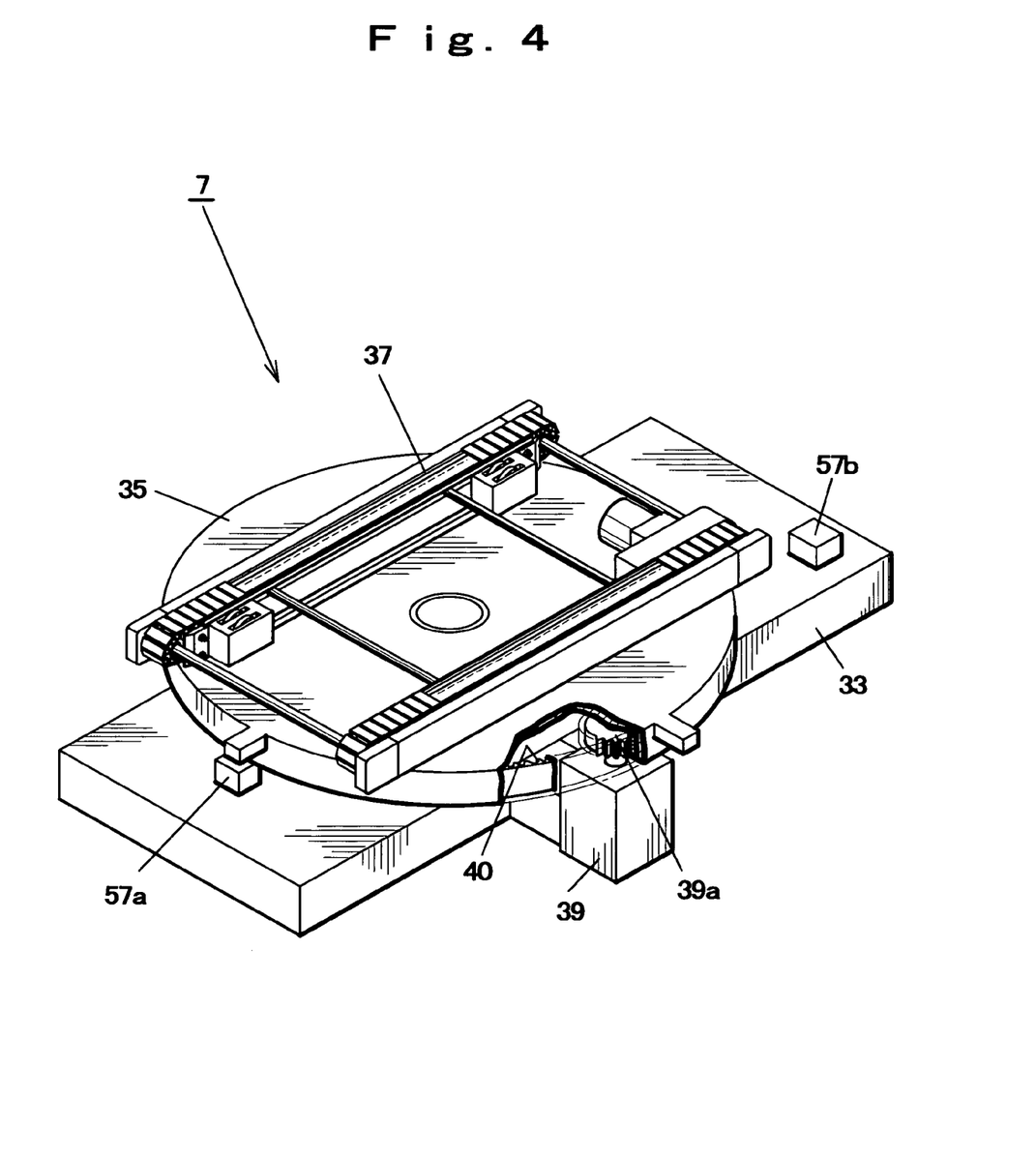
FIG. 4 shows a schematic perspective view of a pivot conveyance apparatus.

The pivot conveyance apparatus 7 is arranged between the third and fourth linear conveyance apparatuses 3, and has a base board 33, a rotation body 35 that is pivotally supported by a shaft of the base board 33, and a rotation conveyor 37 fixed to the rotation body 35. The configuration of the rotation conveyor 37 is equal to that of the unit conveyor 11, and parts or components similar to those of the unit conveyor 11 are indicated with the same reference numerals if required, and detailed explanation of which will be omitted.

The rotation body 35 is made to pivot on the base board 33 by a rotation drive unit corresponding to the link angle formed by the third and fourth linear conveyance apparatuses 3. The rotation drive unit may have a gear 39a that is fixed to an output shaft of an electric motor 39 fixed to the base board 33, and make the gear 39a engage with a plate gear 40 in the form of a circular arc which is arranged in the rotation body 35. Accordingly, when the electric motor 39 rotates, the rotation body 35 is made to rotate. When the electric motor 39 rotates its output shaft, the rotation body 35 is made to rotate. Alternatively, a rod of a cylinder, whose cylinder tube end is swingablly supported by a shaft of the base board 33, is swingablly supported by a shaft of a lever fixed to a supporting shaft, both not shown, that supports the rotation body 35 on the base board 33.

Figure 5:
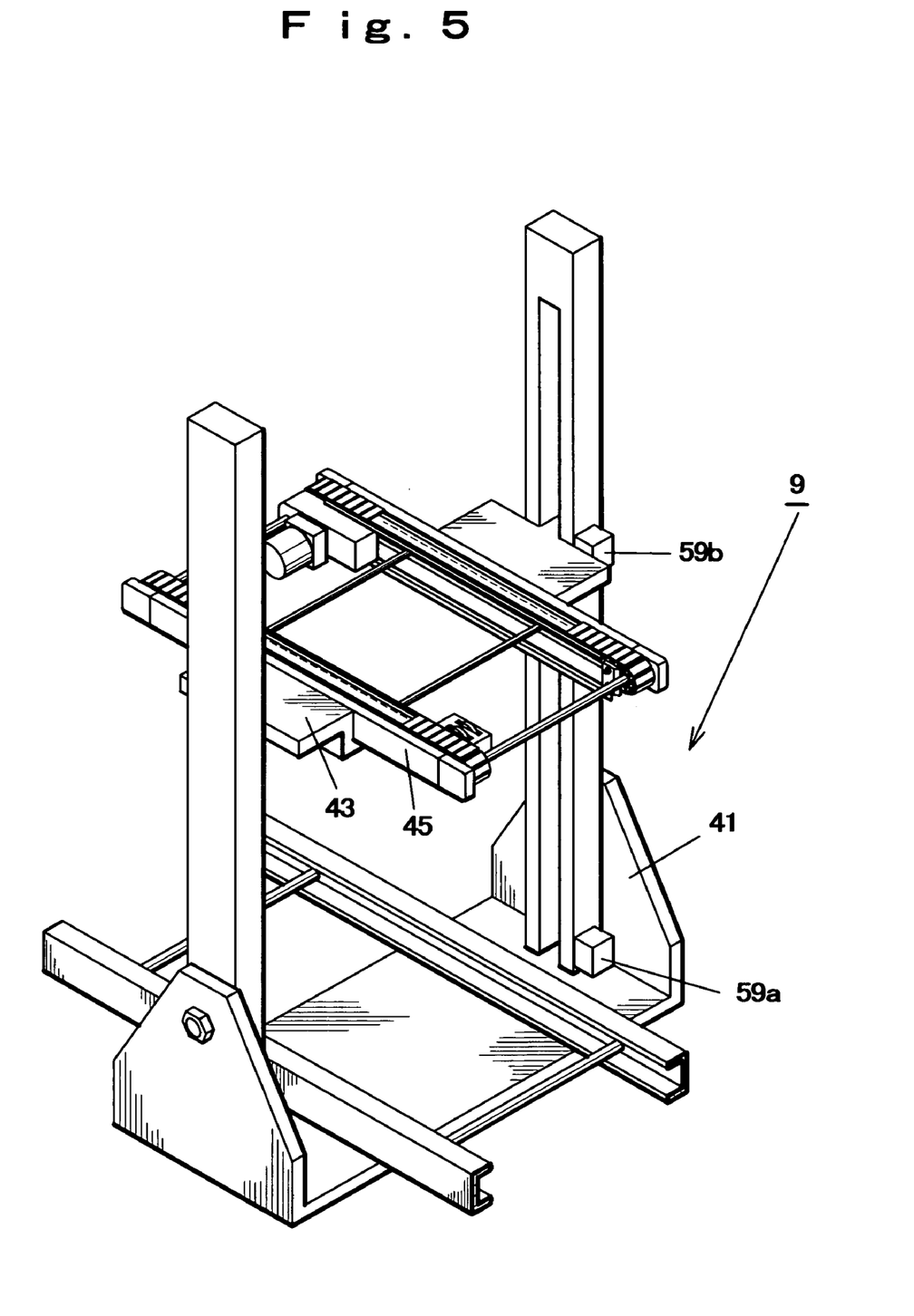
FIG. 5 shows a schematic perspective view of an elevation conveyance apparatus.

The elevation conveyance apparatus 9 is arranged between the fourth and fifth linear conveyance apparatuses 3 which are arranged to form a difference of elevation, and has an up/down frame 41 whose height corresponds to the difference of elevation between the fourth and fifth linear conveyance apparatuses 3, and a board 43 which is so supported by the up/down frame 41 as to move upward and downward, and an elevation conveyor 45 fixed to the board 43. The configuration of the elevation conveyor 45 is equal to that of the unit conveyor 11, and parts or components similar to those of the unit conveyor 11 are indicated with the same reference numerals if required, and detailed explanation of which will be omitted.

The board 43 is made to move upward and downward by an elevation drive unit that may be a well-known elevation drive mechanism such as a belt elevation mechanism in which the board 43 holds part of a belt, not shown, hung on a couple of upper and lower pulleys, also not shown, which are rotatably supported by shafts located at the upper portion and the lower portion of the up/down frame 41 and at least one of which (the lower portion in the drawing) is linked to an electric motor 47. Alternatively, the elevation drive mechanism may be a rack-and-pinion drive mechanism that has a rack, not shown, extending upward and downward which is fixed to the up/down frame 41, and a pinion, also not shown, which is fixed to an output shaft of an electric motor fixed to the board 43 and engaged with the rack.

The unit conveyors 11 constructing the first to fifth linear conveyance apparatuses 3, divergent conveyor 31, rotation conveyor 37, elevation conveyor 45 have two conveying-out side product sensors 49a, 49b arranged in parallel along the direction perpendicular to the conveyance direction at a position of the main frame 13 near the drive shaft 19, and have two conveying-in side product sensors 51a, 51b arranged in parallel along the direction perpendicular to the conveyance direction at a position of the main frame 13 near the driven shaft 21, respectively.

Each of the conveying-out side product sensors 49a, 49b and the conveying-in side product sensors 51a, 51b may be a micro-switch, optical sensor, etc., and outputs an electric signal H (High) when the product 15 is conveyed and the state of the sensor changes from the not-sensing-product to the sensing-product, while outputs an electric signal L(Low) when the state of the sensor changes from the sensing-product to the not-sensing-product, to a control unit 53 arranged for every adjacent unit conveyors 11, unit conveyor 11 and divergent conveyor 31, unit conveyor 11 and rotation conveyor 37, unit conveyor 11 and elevation conveyor 45, respectively, so as to perform free flow conveyance operation to be described later.

In this embodiment, two product sensors 49a, 49b and two product sensors 51a, 51b are arranged at the conveying-out side and at the conveying-in side, respectively. On the other hand, one product sensor may be used for the respective sides so long as electric signals for two circuits can be secured.

Of the conveying-out side product sensors 49a, 49b and conveying-in side product sensors 51a, 51b, the product sensors 49a, 51a output signals to cooperatively control and drive the respective electric motors 23 of the adjacent unit conveyors 11, divergent conveyor 31, rotation conveyor 37, and elevation conveyor 45, which are arranged at the downstream side along the conveyance direction. On the other hand, the other product sensors 49b, 51b output signals to cooperatively control and drive the respective electric motors 23 of the adjacent unit conveyors 11, divergent conveyor 31, rotation conveyor 37, and elevation conveyor 45, which are arranged at the upstream side along the conveyance direction.

The divergent conveyance apparatus 5 has shift position sensors 55a, 55b at shift limit positions of the divergent conveyor 31 or positions to which the divergent conveyor 31 can shift. Also, the pivot conveyance apparatus 7 has pivot position sensors 57a, 57b at pivot limit positions of the rotation conveyor 37 or positions to which the rotation conveyor 37 can pivot. Furthermore, the elevation conveyance apparatus 9 has downward/upward position sensors 59a, 59b at downward/upward limit positions of the elevation conveyor 45 or positions to which the elevation conveyor 45 can move upward and downward. Each of these sensors 55a, 55b, 57a, 57b, 59a, 59b may be a micro-switch, photo-sensor, etc., and outputs a conveyor sense signal when the corresponding divergent conveyor 31, rotation conveyor 37, and elevation conveyor 45 shift to the limit positions.

Next, conveyance operation employing the present system will be explained.

First, the basic manner of conveying the products 15 will be explained. When the products 15 are sequentially put on the conveying-in side unit conveyor 11 of the first linear conveyance apparatus 3, the first linear conveyance apparatus 3 sequentially controls and drives the respective unit conveyors 11 by employing free flow drive control, to be described later, to sequentially convey the products 15 to the conveying-out side of the first linear conveyance apparatus 3.

When conveying the products 15 to the second linear conveyance apparatus 3, which is arranged in parallel with the first linear conveyance apparatus 3 with a distance kept therebetween, the product 15 is put on the divergent conveyor 31 that waits for the product 15 at the conveying-out side of the first linear conveyance apparatus 3. Then, the divergent conveyor 31 is made to shift along the direction perpendicular to the conveyance direction of the first linear conveyance apparatus 3 to be coupled to the second linear conveyance apparatus 3. Then, the divergent conveyor 31 as well as the conveying-in side unit conveyor 11 of the second linear conveyance apparatus 3 are controlled and driven respectively to convey the product 15 to the second linear conveyance apparatus 3. Then, the second linear conveyance apparatus 3 sequentially controls and drives the respective unit conveyors 11 to convey the products 15 to the conveying-out side of the second linear conveyance apparatus 3.

On the other hand, when conveying the products 15 on the first linear conveyance apparatus 3 to the third linear conveyance apparatus 3, the divergent conveyor 31 that waits for the product 15 at the conveying-out side of the first linear conveyance apparatus 3 as well as the conveying-in side unit conveyor 11 of the third linear conveyance apparatus 3 are controlled and driven respectively to convey the product 15 from the divergent conveyor 31 to the third linear conveyance apparatus 3. Then, the third linear conveyance apparatus 3 sequentially controls and drives the respective unit conveyors 11 to convey the products 15 to the conveying-out side of the third linear conveyance apparatus 3.

When conveying the products 15, which are conveyed to the conveying-out side of the third linear conveyance apparatus 3, to the fourth linear conveyance apparatus 3 that is so arranged as to form a predetermined angle together with the third linear conveyance apparatus 3, the rotation conveyor 37 of the pivot conveyance apparatus 7 is made to pivot such that the conveying-in side thereof is coupled to the conveying-out side of the third linear conveyance apparatus 3 to wait for the product 15. When the product 15 is conveyed to the conveying-out side of the third linear conveyance apparatus 3, the conveying-out side unit conveyor 11 of the third linear conveyance apparatus 3 as well as the rotation conveyor 37 are controlled and driven respectively to convey the product 15 to the rotation conveyor 37.

Then, the electric motor 39 is driven to rotate the rotation body 35 along a predetermined rotation direction by a predetermined angle so as to couple the conveying-out side of the rotation conveyor 37 to the conveying-in side of the fourth linear conveyance apparatus 3 being so arranged as to form a predetermined angle together with the third linear conveyance apparatus 3. Then, the rotation conveyor 37 as well as the conveying-in side unit conveyor 11 of the fourth linear conveyance apparatus 3 are controlled and driven respectively to convey the product 15 on the rotation conveyor 37 to the fourth linear conveyance apparatus 3. Then, the fourth linear conveyance apparatus 3 sequentially controls and drives the respective unit conveyors 11 to convey the products 15 to the conveying-out side of the fourth linear conveyance apparatus 3.

When conveying the products 15, which are conveyed to the conveying-out side of the fourth linear conveyance apparatus 3, to the fifth linear conveyance apparatus 3 that is so arranged as to form a predetermined difference of elevation together with the fourth linear conveyance apparatus 3, the elevation conveyor 45 of the elevation conveyance apparatus 9 is made to move downward such that the height thereof is equalized with that of the fourth linear conveyance apparatus 3 to wait for the product 15. Then, the conveying-out side unit conveyor 11 of the fourth linear conveyance apparatus 3 as well as the elevation conveyor 45 are controlled and driven respectively to convey the product 15 on the fourth linear conveyance apparatus 3 to the elevation conveyor 45.

Then, the electric motor 47 is driven to move the elevation conveyor 45 upward so as to equalize the height thereof with that of the fifth linear conveyance apparatus 3 to couple the conveying-out side of the elevation conveyor 45 to the conveying-inside of the fifth linear conveyance apparatus 3. Then, the elevation conveyor 45 as well as the conveying-in side unit conveyor 11 of the fifth linear conveyance apparatus 3 are controlled and driven respectively to convey the product 15 on the elevation conveyor 45 to the fifth linear conveyance apparatus 3. Then, the fifth linear conveyance apparatus 3 sequentially controls and drives the respective unit conveyors 11 to convey the products 15 to the conveying-out side of the fifth linear conveyance apparatus 3.

Next, the free flow conveyance operation by the respective unit conveyors 11 of the first to fifth linear conveyance apparatus 3 will be explained.

In the operation pattern, the products 15 put on the conveying-in side of the first to fifth linear conveyance apparatus 3 are sequentially conveyed in the free flow manner. For convenience of explanation, it is assumed that the respective unit conveyors 11 that are linearly coupled from the conveying-in side to the conveying-out side are represented by reference numerals of 11-1, 11-2, . . . , 11-n, respectively, while the conveying-out side product sensors 49a, 49b and the conveying-in side product sensors 51a, 51b of the unit conveyor 11-1, 11-2, . . . , 11-n are represented by reference numerals of 49a-1, 49a-2, . . . , 49a-n, 49b-1, 49b-2, . . . , 49b-n, 51a-1, 51a-2, . . . , 51a-n, 51b-1, 51b-2, . . . , 51b-n, respectively.

Figure 6:
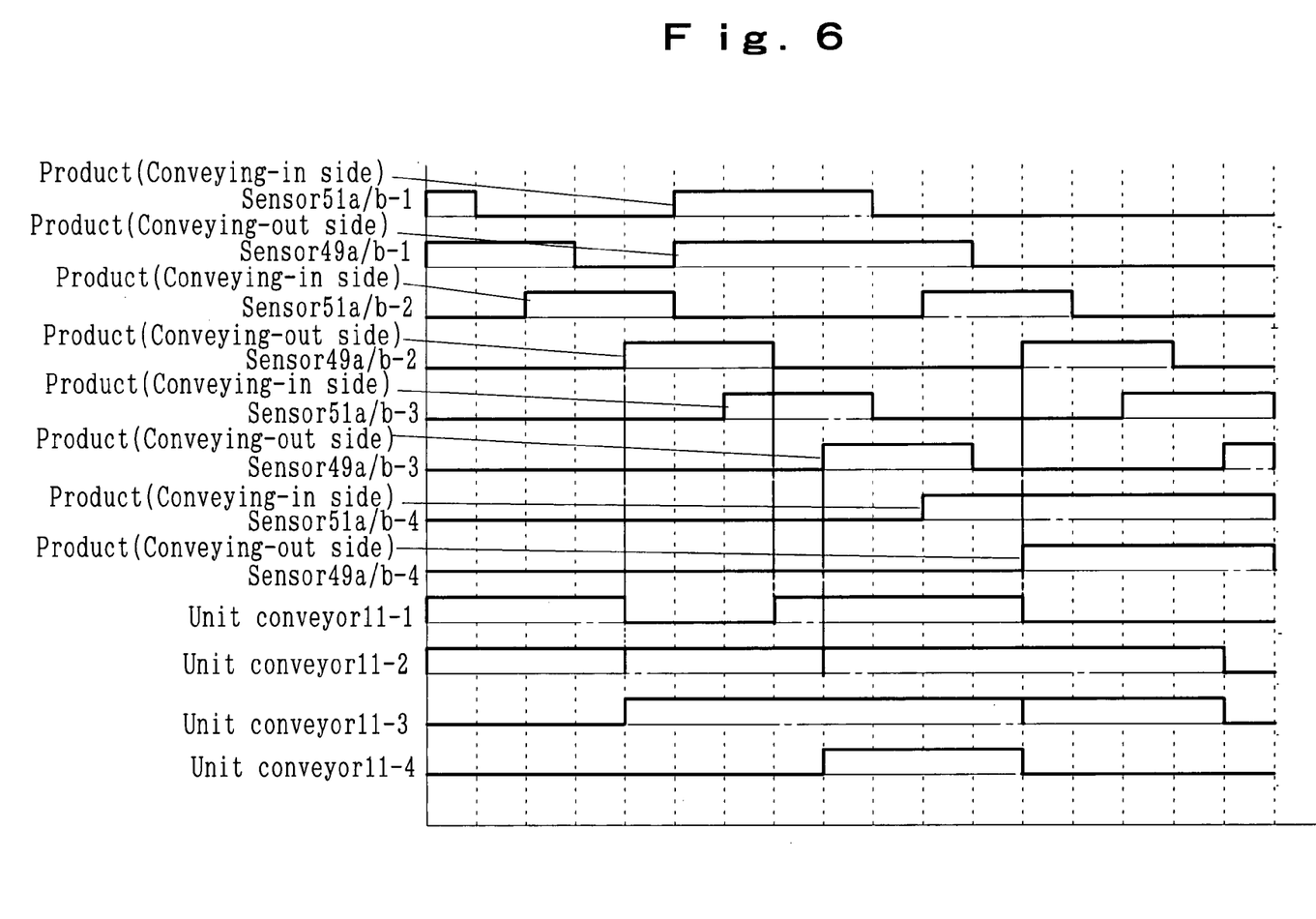
FIG. 6 shows a timing chart indicative of signals from respective product sensors of respective unit conveyors and respective driving states.
Figure 7:
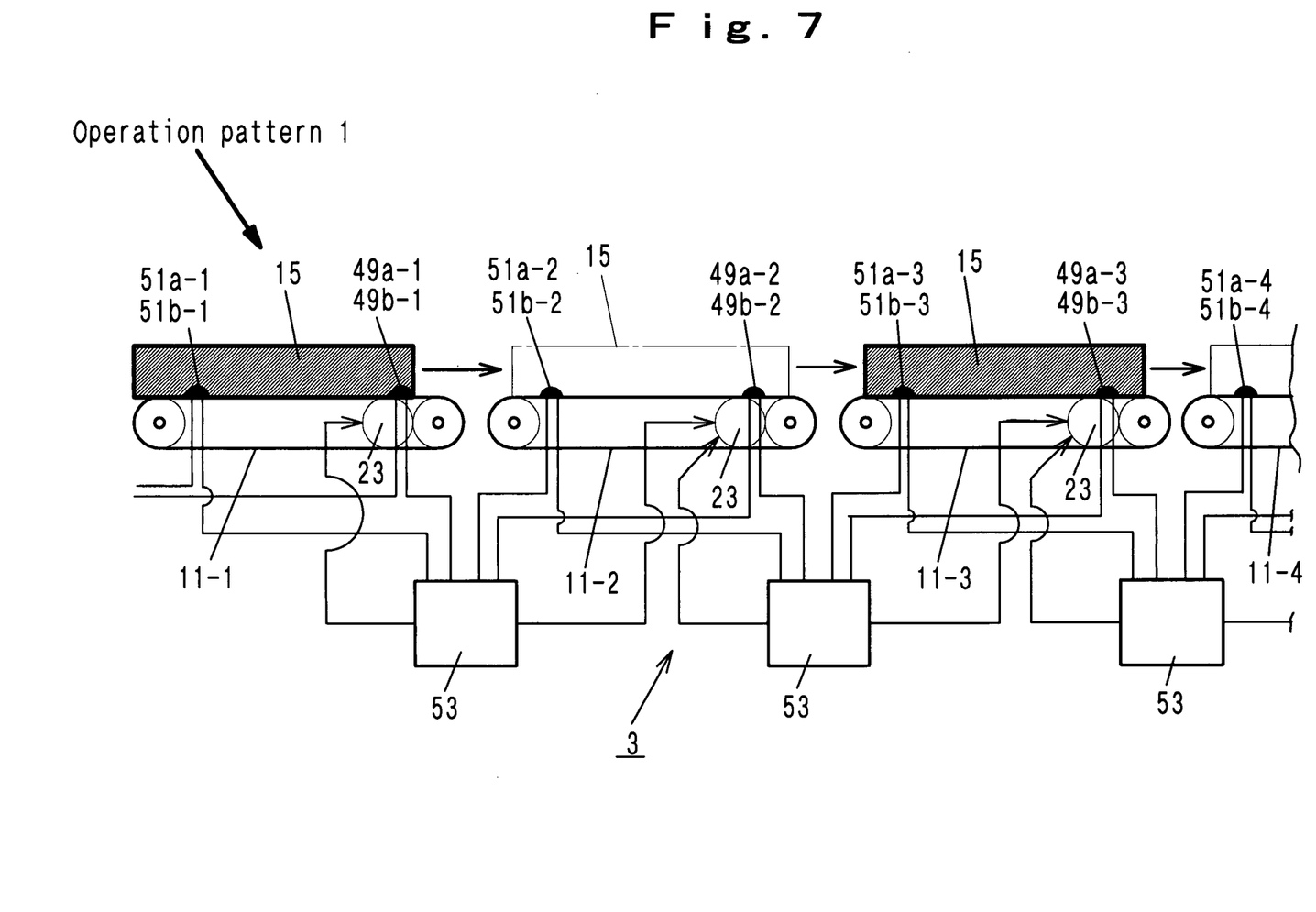
FIG. 7 shows an explanatory diagram indicative of free flow conveyance.

When the product 15 is put on the unit conveyor 11-1 located at the conveying-in side of the respective linear conveyance apparatuses 3, the conveying-out side product sensor 49a-1 and the conveying-in side product sensor 51a-1 become of the state of sensing a product or the sensing-product state H. At this time, under the condition that the conveying-out side product sensor 49b-2 and the conveying-in side product sensor 51b-2 of the unit conveyor 11-2 that is located at the downstream side along the conveyance direction of the unit conveyor 11-1 are of the state of not sensing a product or the not-sensing-product state L, the respective electric motors 23 of the unit conveyor 11-1 and the unit conveyor 11-2 are driven to convey the product 15 on the unit conveyor 11-1 to the following unit conveyor 11-2.

In the conveyance operation, at the timing when the conveying-in side product sensor 51a-1 and the conveying-out side product sensor 49a-1 become of the not-sensing-product state L in this order, and the conveying-out side product sensors 49a/b-2 become of the sensing-product state H after the conveying-in side product sensors 51a/b-2 become of the sensing-product state H, the electric motor 23 of the unit conveyors 11-1 is turned off.

When the electric motor 23 of the unit conveyors 11-1 is turned off, under the condition that the conveying-out side product sensor 49a-2 and the conveying-in side product sensor 51a-2 are of the sensing-product state H, and the product 15 is not conveyed to the unit conveyor 11-3 that is located at the downstream side along the conveyance direction of the unit conveyor 11-2, and the conveying-out side product sensor 49b-3 and the conveying-in side product sensor 51b-3 are of the not-sensing-product state L, the electric motor 23 of the following unit conveyor 11-2 is continuously driven.

Repeating above-described operation, when the product 15 is sequentially put on the conveying-in side unit conveyors 11-1 of the respective linear conveyance apparatuses 3, the respective unit conveyors 11-1, 11-2, . . . , 11-n sequentially convey the products 15 to the conveying-out side with a distance corresponding to a conveyance length of the unit conveyor 11 or the length of the product 15 kept therebetween.

Next, the conveyance operation of the divergent conveyor 31 of the divergent conveyance apparatus 5, rotation conveyor 37 of the pivot conveyance apparatus 7, and elevation conveyor 45 of the elevation conveyance apparatus 9 will be explained. For convenience of explanation, the conveyance operation of the divergent conveyor 31 alone will be explained and detailed explanation of the rotation conveyor 37 and elevation conveyor 45 will be omitted.

Firstly, the operation of conveying the product 15 put on the conveying-out side unit conveyor 11 of the first linear conveyance apparatuses 3 to the divergent conveyor 31 will be explained. When the product 15 is conveyed to the unit conveyors 11-n that is located at the conveying-out side of the first linear conveyance apparatus 3, the conveying-out side product sensor 49a-n and the conveying-in side product sensor 51a-n become of the sensing-product state H. Under the condition that the shift position sensor 55a of the divergent conveyor 31, which judges that the conveying-in side of the divergent conveyor 31 is located at the conveying-out side of the first linear conveyance apparatus 3, is of the sensing-shift state, and the conveying-out side product sensor 49a and the conveying-in side product sensor 51a of the divergent conveyor 31 are of the not-sensing-product state L, the respective electric motors 23 of the unit conveyor 11-n and the divergent conveyor 31 are driven to convey the product 15 on the unit conveyor 11-n to the divergent conveyor 31.

In the operation of conveying the product 15, at the timing when the conveying-in side product sensor 51a-n and the conveying-out side product sensor 49a-n of the unit conveyor 11-n become of the not-sensing-product state L in this order, and the conveying-out side product sensors 49a/49b of the divergent conveyor 31 become of the sensing-product state H after the conveying-in side product sensors 51a/51b thereof become of the sensing-product state H, the electric motors 23 of the unit conveyor 11-n and the divergent conveyor 31 are turned off, completing the operation of conveying the product 15 to the divergent conveyor 31.

At this time, since the shift position sensor 55a is of the sensing-shift state, referring to a shift command signal of the divergent conveyance apparatus 5, in case a shift command signal to shift the divergent conveyor 31 to the second linear conveyance apparatus 3 side is set up, the electric motor is driven to shift the divergent conveyor 31 to the second linear conveyance apparatus 3 side.

Conversely, in case a shift command signal to shift the divergent conveyor 31 to the second linear conveyance apparatus 3 side is not set up, under the condition that the shift position sensor 55a is of the sensing-shift state, and the conveying-in side product sensors 51a/51b and the conveying-outside product sensors 49a/49b of the divergent conveyor 31 are of the sensing-product state H, and the conveying-in side product sensors 51a/51b-1 and the conveying-out side product sensors 49a/49b-1 of the unit conveyor 11-1 located at the conveying-in side of the third linear conveyance apparatus 3 are of the not-sensing-product state L, the divergent conveyor 31 and the unit conveyor 11-1 located at the conveying-in side of the third linear conveyance apparatus 3 are driven to convey the product 15 on the divergent conveyor 31 to the unit conveyor 11-1 located at the conveying-in side of the third linear conveyance apparatus 3. Then, the unit conveyors 11-1, 11-2, . . . , 11-n are sequentially driven to convey the products 15 to the conveying-out side of the third linear conveyance apparatus 3 in the free flow manner.

On the other hand, in case a shift command signal to shift the divergent conveyor 31 to the second linear conveyance apparatus 3 side is set up, the electric motor is driven to shift the divergent conveyor 31 to the second linear conveyance apparatus 3 side. When the divergent conveyor 31 is shifted, and the shift position sensor 55a of the third linear conveyance apparatus 3 side becomes of the not-sensing-shift state and the other shift position sensor 55b of the second linear conveyance apparatus 3 side becomes of the sensing-shift state, under the condition that the other shift position sensor 55b is of the sensing-shift state, and the conveying-in side product sensors 51a/51b and the conveying-out side product sensors 49a/49b of the divergent conveyor 31 are of the sensing-product state H, and the conveying-in side product sensors 51a/51b-1 and the conveying-out side product sensors 49a/49b-1 of the unit conveyors 11-1 located at the conveying-in side of the second linear conveyance apparatus 3 are of the not-sensing-product state L, the divergent conveyor 31 and the unit conveyor 11-1 located at the conveying-in side of the second linear conveyance apparatus 3 are driven to convey the product 15 on the divergent conveyor 31 to the unit conveyor 11-1 located at the conveying-in side of the second linear conveyance apparatus 3.

On the other hand, when the conveyance operation is applied to the pivot conveyance apparatus 7 and the elevation conveyance apparatus 9, the shift position sensor 55a is changed to the pivot position sensor 57a and the downward position sensor 59a, respectively, and the other shift position sensor 55b is changed to the other pivot position sensor 57b and the upward position sensor 59b, respectively.

According to the present invention, the linear conveyance apparatus 3, divergent conveyance apparatus 5, pivot conveyance apparatus 7, and elevation conveyance apparatus 9 may be properly combined depending on a desired conveyance route to configure a conveyance system combining parallel conveyance operation, upper and lower two-stage conveyance operation, divergent conveyance operation, which are linked collectively or linked a slope.

Figure 8:
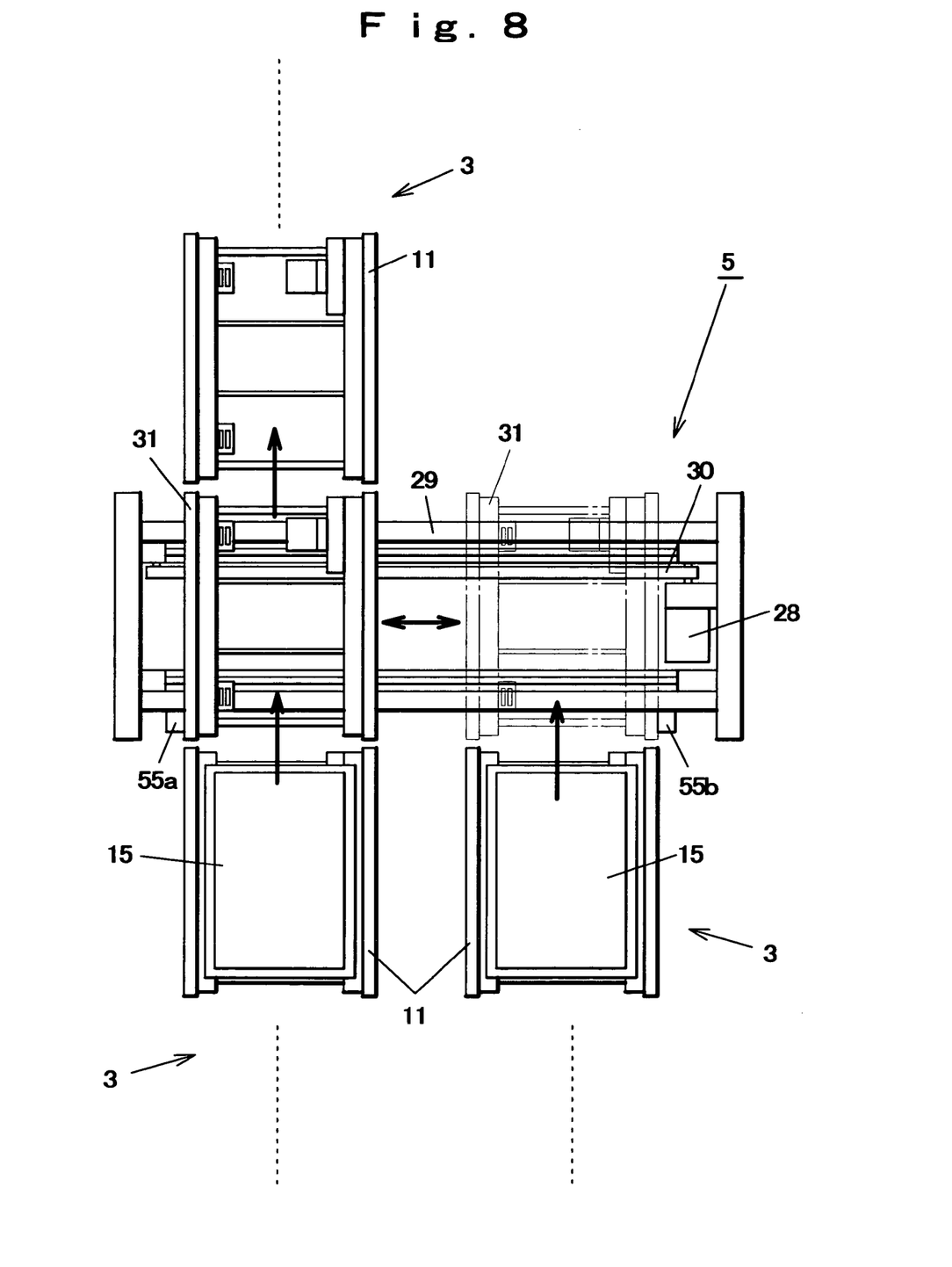
FIG. 8 shows an explanatory diagram of an alternative embodiment of the conveyance system.

That is, as shown in FIG. 8, the present invention may configure a system that collectively conveys products arranged between the conveying-out side of the parallel arranged two linear conveyance apparatuses 3 and the conveying-in side of the linear conveyance apparatus 3 which are to be dispersedly conveyed.

Figure 9:
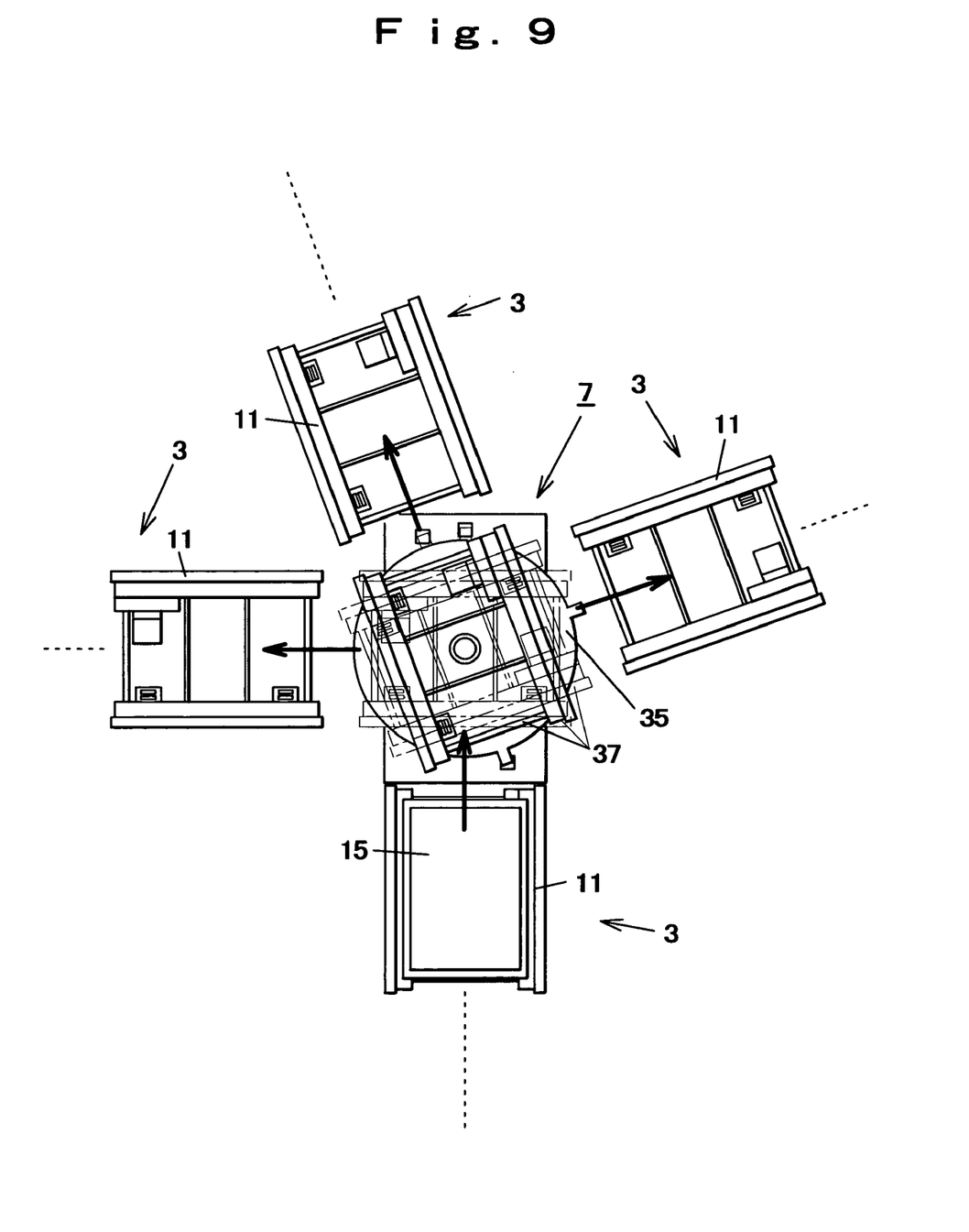
FIG. 9 shows an explanatory diagram of another alternative embodiment of the conveyance system.

Furthermore, as shown in FIG. 9, the present invention may configure a system in which one mainstream linear conveyance apparatus 3 and a plurality of linear conveyance apparatuses 3, each forming predetermined angles of such as 20 degrees, 90 degrees, −70 degrees, etc. against the mainstream linear conveyance apparatus 3, are arranged so as to change the conveyance route from the mainstream linear conveyance apparatus 3 to the respective angle-forming linear conveyance apparatuses 3 using the pivot conveyance apparatus 7. Otherwise, the present invention may configure a system in which the products 15 conveyed by a plurality of the linear conveyance apparatuses 3 are collectively conveyed to one linear conveyance apparatus 3.

Figure 10:
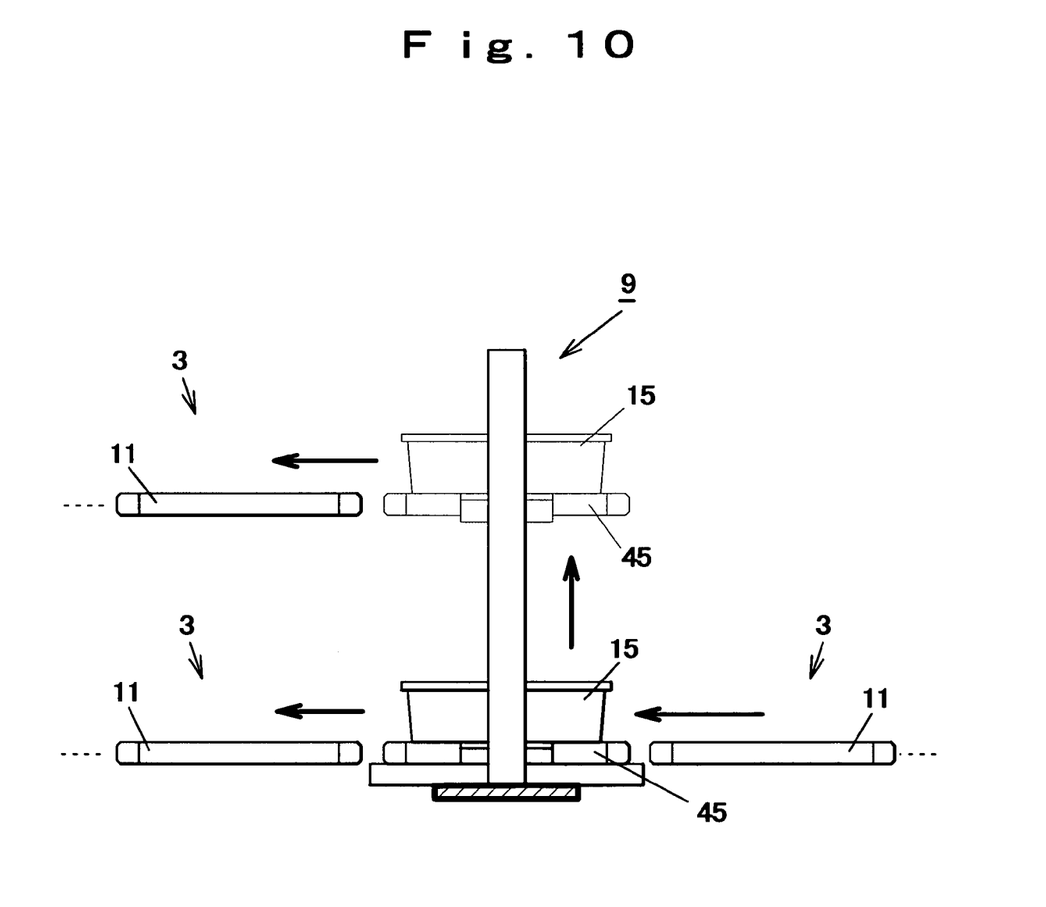
FIG. 10 shows an explanatory diagram of yet another alternative embodiment of the conveyance system.
Figure 11:
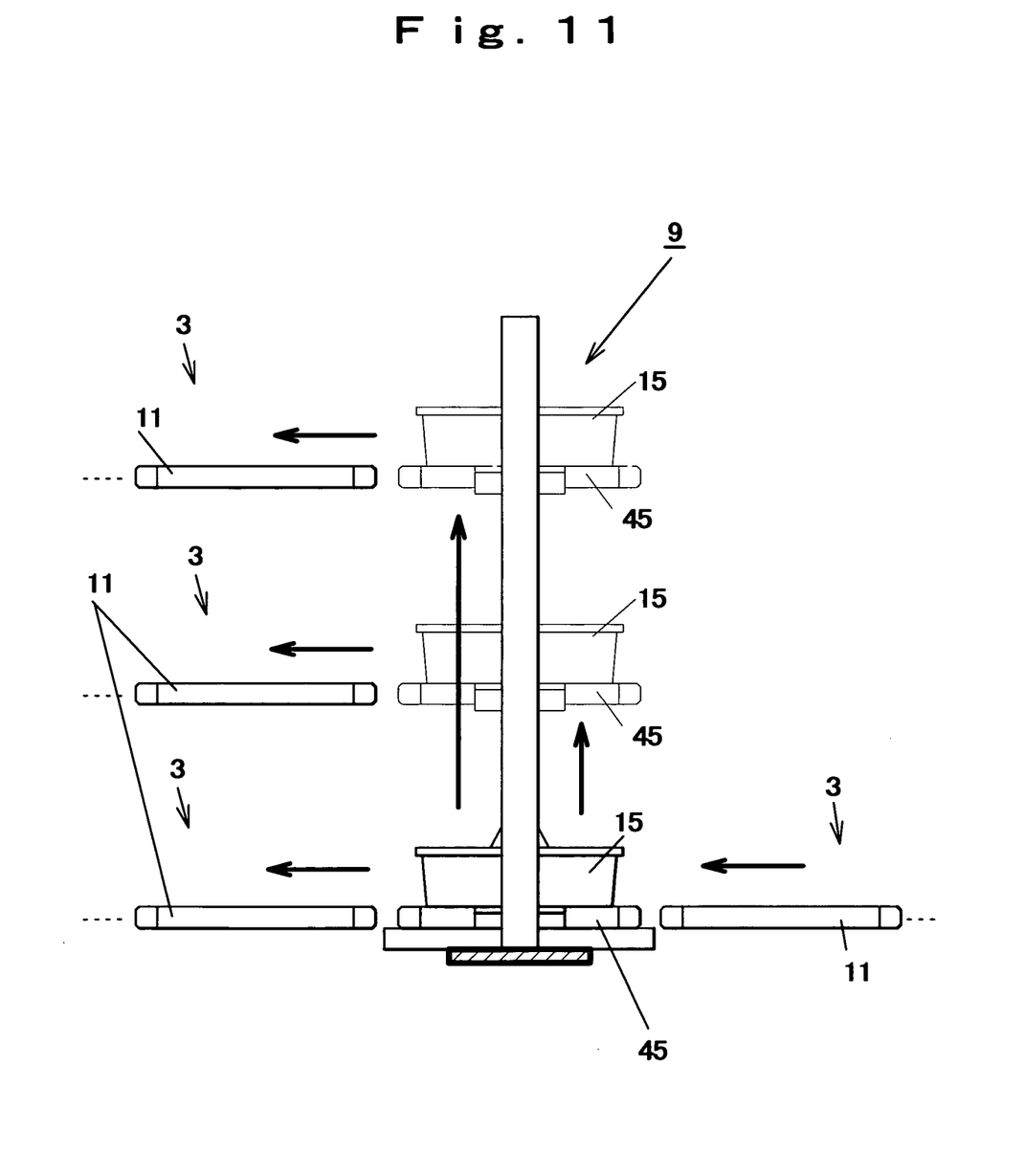
FIG. 11 shows an explanatory diagram of yet another alternative embodiment of the conveyance system.
Figure 12:
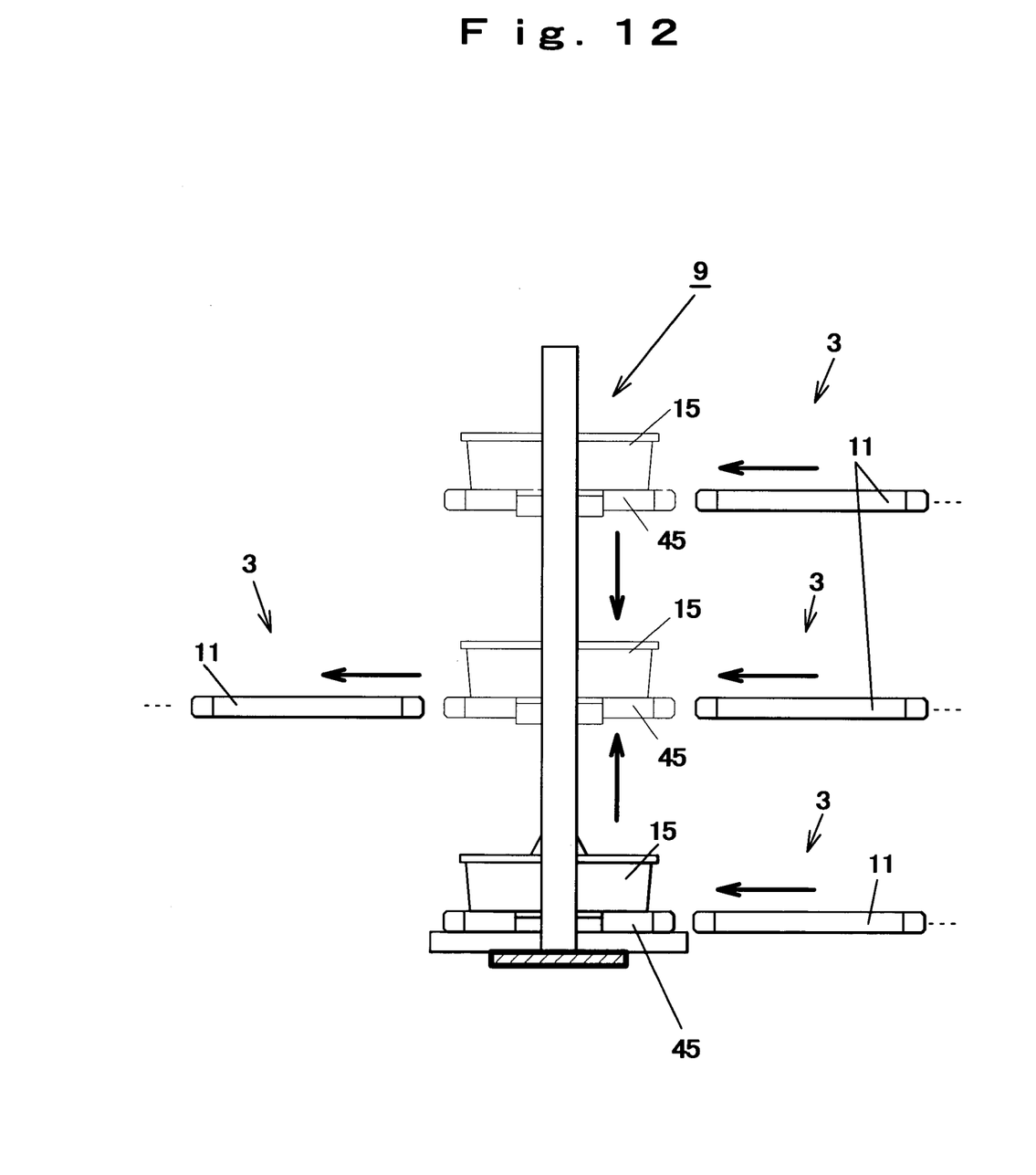
FIG. 12 shows an explanatory diagram of yet another alternative embodiment of the conveyance system.

Furthermore, as shown in FIG. 10, the present invention may configure a system in which two linear conveyance apparatuses 3 are arranged at the upper and lower sides of conveying-out side of the elevation conveyance apparatus 9 to change a lower conveyance route between an upper conveyance route and the lower conveyance route, otherwise, as shown in FIG. 11, a system in which three or more linear conveyance apparatuses 3 of desired height are arranged at the conveying-out side of the elevation conveyance apparatus 9 to change a lower conveyance route among conveyance routes of arbitrary height, otherwise, as shown in FIG. 12, a system in which a plurality of linear conveyance apparatuses 3 and at least one linear conveyance apparatus 3 are arranged at the conveying-in side and conveying-out side of the elevation conveyance apparatus 9 respectively so as to integrate the plural conveyance routes so that the products 15 from the plural linear conveyance apparatus 3 are collectively conveyed to at least one linear conveyance apparatus 3.

What is claimed is:

1. A free flow conveyance system comprising:
    a plurality of linear conveyance apparatuses each having a plurality of unit conveyors linearly arranged, the conveyance length of each unit conveyor being substantially equal to the length of products along the conveyance direction, and each unit conveyor having a conveying-in side and a conveying-out side; and,
    so as to form an arbitrary conveyance route, at least one of a pivot conveyance apparatus having a unit conveyor which is arranged between the linear conveyance apparatuses being so arranged as to form a predetermined angle, and pivots the unit conveyor by a predetermined angle to selectively link the linear conveyance apparatuses by coupling the conveying-in side of the unit conveyor to the conveying-out side of a linear conveyance apparatus and by coupling the conveying-out side of the unit conveyor to the conveying-in side of a linear conveyance apparatus,
    an elevation conveyance apparatus having a unit conveyor which is arranged between the linear conveyance apparatuses being so arranged as to form a predetermined difference of elevation, and moves the unit conveyor upward and downward by a predetermined height to selectively link the linear conveyance apparatuses by coupling the conveying-in side of the unit conveyor to the conveying-out side of the unit conveyor to the conveying-out side of the unit conveyor to the conveying-in side of a linear conveyance apparatus, and
    a divergent conveyance apparatus having a unit conveyor which is arranged between a linear conveyance apparatus along the conveyance direction and parallel arranged at least two linear conveyance apparatuses along the conveyance which are of the same conveyance direction with a predetermined distance kept therebetween along the direction perpendicular to the conveyance direction, and selectively shifts the unit conveyor along the direction perpendicular to the conveyance direction to selectively couple the linear conveyance apparatus along the conveyance direction to one of the parallel arranged linear conveyance apparatuses along the conveyance direction,
    wherein product sensors are arranged at the conveying-in side as well as at the conveying-out side of the respective unit conveyors of the linear conveyance apparatuses, the pivot conveyance apparatus, the elevation conveyance apparatus, and the divergent conveyance apparatus, and;
    wherein the respective product sensors of the respective unit conveyors output two kinds of signals based on the sensing-product state and the not-sensing product state, and one of the signals is associated with a signal from product sensors of an adjacent unit conveyor outputting two kinds of signals based on the sensing-product state and the not-sensing product state, and one of the signals is associated with a signal from product sensors of an adjacent unit conveyor of the upstream side along the conveyance direction, while the other of the signals is associated with a signal from product sensors of an adjacent unit conveyor of the downstream side along the conveyance direction, and under the association of the signals, when a product is conveyed to a unit conveyor of the upstream side along the conveyance direction and product sensors of the unit conveyor are in the sensing-product state, in case respective product sensors of a unit conveyor of the downstream side along the conveyance direction are of the not-sensing product state, and when the product is conveyed to the unit conveyor of the downstream side along the conveyance direction and conveying-out side product sensors thereof become of the sensing-product state, the respective adjacent unit conveyors are driven or stopped.

* * * * *